(12) United States Patent
Miyata

(10) Patent No.: US 7,202,097 B2
(45) Date of Patent: Apr. 10, 2007

(54) LIGHT POLARIZING FILM, A METHOD OF CONTINUOUSLY FABRICATING SAME, AND REFLECTIVE OPTICAL FILM USING SAME

(75) Inventor: Seizo Miyata, Nishi-Tokyo (JP)

(73) Assignees: Siezo Miyata, Tokyo (JP); Koei Shoji Limited Company, Tokyo (JP)

( * ) Notice: Subject to any disclaimer, the term of this patent is extended or adjusted under 35 U.S.C. 154(b) by 78 days.

(21) Appl. No.: 10/986,080

(22) Filed: Nov. 12, 2004

(65) Prior Publication Data

US 2005/0106769 A1      May 19, 2005

(30) Foreign Application Priority Data

Nov. 14, 2003   (JP)   ............... 2003-386009

(51) Int. Cl.
*H01L 21/00*   (2006.01)
(52) U.S. Cl. .............................. 438/30; 438/29; 257/40
(58) Field of Classification Search .................. 438/29, 438/30; 257/40, 642, 643, 759
See application file for complete search history.

(56) References Cited

U.S. PATENT DOCUMENTS 6,783,814 B2 *   8/2004   Swager et al. ................ 428/11
2002/0150697 A1 *   10/2002   Swager et al. .............. 428/1.1

FOREIGN PATENT DOCUMENTS

| JP | 5-19247 | 1/1993 |
| JP | 9-90122 | 4/1997 |
| JP | 2001-74935 | 3/2001 |
| JP | 2002-22966 | 1/2002 |

* cited by examiner

*Primary Examiner*—Phuc T. Dang
(74) *Attorney, Agent, or Firm*—Armstrong, Kratz, Quintos, Hanson & Brooks LLP

(57) ABSTRACT

There are provided a light polarizing film of a grid type, usable for light at a wavelength in a range of a visible light region to an infrared region, a method of continuously fabricating the same, and a reflective optical film using the light polarizing film. A polypropylene film is passed through rolls 12, a first constant temperature cell 13, and rolls 12' to thereby undergo uniaxial drawing by 4-fold. Thereafter, an aluminum metal is vapor-deposited to a thickness of 100 nm in a vacuum deposition cell 14 to be subsequently passed through rolls 15, a second constant temperature cell 16, and rolls 15', undergoing uniaxial drawing by 2-fold again while partially crystallizing the polypropylene film. At this point in time, the aluminum metal undergoes substantially uniform cracking in a direction orthogonal to a drawing direction. Thereafter, heat treatment is applied to the film in a third constant temperature cell 17, and the film is subsequently taken out by take-up rolls 18. The film-like light polarizing film obtained had a degree of polarization at 99.5%, and light transmittance at 90%, in a region of infrared wavelength in a range of 1 to 10 μm. With two sheets of the films crossed at right angles, reflectance thereof for infrared rays was measured and was found at not less than 99.9%.

15 Claims, 5 Drawing Sheets

LIGHT POLARIZING FILM, A METHOD OF CONTINUOUSLY FABRICATING SAME, AND REFLECTIVE OPTICAL FILM USING SAME

FIELD OF THE INVENTION

The invention relates to a light polarizing film, a method of continuously fabricating the same, and a reflective optical film using the same, and more particularly, to a polarizing film of a grid type, with anisotropic electroconductive substance in a range of several nm to several tens of μm in width, and in a range of several tens of nm to several mm in length, formed in the surface or interior thereof by controlling the higher-order structure of a polymer, usable for light at a wavelength in a range from a visible light region to an infrared region, a method of continuously fabricating the same, and a reflective optical film using the light polarizing film.

BACKGROUND OF THE INVENTION

As for a method of fabricating a film-like light polarizing device, there have so far been known three kinds of methods. A first method is a method of doping a poly(vinyl alcohol) (PVA) film that was drawn with a dichromic dye such as iodine, and so forth, as disclosed in Patent Document 1, i.e., JP-05-019247A (para No. 0008). This is a method whereby a PVA filmwith a dichromic substance, such as an iodine complex, adsorbed thereto is passed between rotating rollers to undergo uniaxial drawing while being heated, thereby aligning PVA molecules as well as the iodine complex. The film-like light polarizing device of such a makeup as described permits a light component having an oscillation plane orthogonal to a film-drawing direction to pass therethrough, absorbing a light component having an oscillation plane parallel with the film-drawing direction to be thereby lost, so that two sheets of the film-like light polarizing devices superimposed one on another appear black because the light components having all film fabricated by the first method is inexpensive, and is excellent in light quenching ratio, so that it is in widespread use in the current liquid crystal display device, and so forth, however, an application region thereof is limited to the visible light region.

A second method of fabricating a film-like light polarizing device is a method of dispersing two kinds of polymers or inorganic fine particles into a polymer to be subsequently subjected to uniaxial drawing as disclosed in Patent Document 2, i.e. JP-2002-022966A {claims, para Nos, (0033) to (0043)}. This is a method of, for example, causing respective refractive indexes of mixed substances to coincide with each other in a drawing direction while causing a refractive index difference Δn as large as possible to occur in the direction orthogonal to the drawing direction. In this case, in contrast with the method described, the refractive index difference Δn may be enlarged in the drawing direction while the refractive index difference Δn in the direction orthogonal to the drawing direction may be rendered as Δn=0. In either case, ideally the refractive index difference Δn in one direction is rendered as large as possible, that is, not less than 0.5, while the refractive index difference Δn in the other direction is rendered as Δn=0. However, it is extremely difficult to find out such a condition. Accordingly, with the second method of fabricating the light polarizing film, a light polarizing film small in area can be fabricated, but if there occurs a slight difference in localized reduction ratio by drawing, a refractive index difference Δn in a localized portion comes to differ from that in other portions, resulting in weakened polarizing function. Further, in order to obtain predetermined polarizing performance, there is the need for increasing the thickness thereof to some extent, which makes it difficult to obtain a high-performance light polarizing film small in thickness.

Then, a third method of fabricating a film-like light polarizing film is a method of obtaining light polarization property by arranging intervals of fine wires so as to be not longer than a wavelength of light to be polarized. A light polarizing film fabricated by this method is called a grid-type light polarizing film exhibiting an action as the light polarizing film if an interval d between the fine wires adjacent to each other is sufficiently shorter than a light wavelength λ, more specifically, if the fine wires are disposed at equal intervals of d<λ/2. The light polarizing film of this type has a function of reflecting a light component having an oscillation plane in the longitudinal direction of metal wires while transmitting a light component having an oscillation plane in the direction orthogonal to the longitudinal direction of the metal wires. Accordingly, this grid-type light polarizing film fabricated by the third method is contrary in operation principle to the film-like light polarizing device fabricated by the first method, and if two sheets of the grid-type light polarizing films are superimposed one on the other so as to cross each other at right angles, these act in effect like a mirror because incident light components having all the oscillation planes are reflected. With the grid-type light polarizing film, light transmittance thereof can be enhanced, however, electro-conductive fine wires and the intervals thereof need to be arranged so as to be not longer than the wavelength of light to be polarized. Hence, the grid-type light polarizing film has so far been used for infrared rays long in wavelength, and so forth, but has seldom been used for visible light because of difficulty with effecting polarization of the visible light.

By way of example of the grid-type light polarizing film described as above, in Patent Document 3, there is disclosed a method of fabricating a grid-type light polarizing film of a structure wherein metal is distributed in a grid pattern inside dielectrics, or on the surface thereof, fabricated by integrating two dielectrics with each other with the metal in the grid pattern interposed therebetween, and subsequently, by hot drawing or rolling the metal in whole, in the grid pattern, in a linear direction.

However, since the method of fabricating the grid-type light polarizing film, disclosed Patent Document 3, i.e., JP-9-090122 A {claims, para Nos, (0011) to (0021) FIG. 1}, requires heating up to a temperature causing the metal to expand, if a polymer substance is used for the dielectrics, the polymer substance will be in a melt condition or undergo depolymerization at such a temperature, so that it is impossible to fabricate the light polarizing film, and also, it is, in effect, difficult to enlarge the area thereof.

Still further, in Patent Document 4, i.e., JP-2001-074935 A {claims, para Nos, (0010) to (0014), FIG. 1, FIG. 2}, there is disclosed a grid-type light polarizing film of a structure comprised of metal portions and dielectric portions, anisotropic in shape, fabricated by forming a metal film on a transparent and soft substrate, and subjecting the substrate, and the metal film to drawing, at a temperature not higher than the melting point of the metal film.

With the method of fabricating the grid-type light polarizing film, disclosed Patent Document 4, however, as the transparent and soft substrate is uniformly drawn by drawing operation, an uniform drawing force also acts on the metal film on top of the substrate, so that metal wires formed out of the metal film will not be regularly arranged at intervals on the order of a light wavelength. More specifically, in the case of using a metal such as gold, excellent in ductility, the metal, together with the substrate, will be elongated to thereby keep covering the substrate, and on the other hand, in the case of using a metal such as aluminum, poor in ductility, irregular cracking will occur to the metal, or the metal will peel off the substrate, so tat there exists a problem that a polarization effect is hardly obtainable.

Furthermore, as disclosed Patent Document 5, i.e., JP-2003-529680A (claims), there has recently been made public a method of fabricating a light polarizing film for a visible light region by forming fine grooves on a glass sheet with the use of a photo resist, and by vapor-depositing a metal thereon, however, with this method, fabrication cost becomes high because of a complex fabrication process involved, and moreover, it is practically impossible to increase an area to 5 $cm^2$ or larger.

Thus, with the method of fabricating the grid-type light polarizing film, described as above, only the grid-type light polarizing film with an area several $cm^2$ at the maximum has been obtained, and it has been impossible to obtain a film-like light polarizing device of the grid-type with an area larger than the area described as above. Hence, there has been a strong demand for a film-like light polarizing device of the grid-type, large in area, with the polarization effect thereof enhanced in a range from a visible light region to an infrared region, having a structure wherein there are alternately disposed electro-conductors, and dielectrics, each having a width on the order of 1/10 of a wavelength in use, that is, in a range of several 10 nm to several μm, and a length not less than 10 times as long as the wavelength in use, that is in a range of several hundred nm to several hundred μm.

SUMMARY OF THE INVENTION

The inventor has continued various studies to overcome the problems, described from the fabrication point of view as above, with the conventional grid-type light polarizing film to thereby provide a method of continuously fabricating a grid-type light polarizing film which is high in performance, and is large in area, but can be fabricated at a low cost. As a result, the inventor has found out that electroconductive fine wires having a width not greater than a wavelength of light or a radio wave can be arranged at intervals each sufficiently smaller than the wavelength of the light or the radio wave by controlling the micro structure of a polymer film with the use of rolling techniques, leading to successful completion of the present invention.

It is therefore a first object of the invention to provide a grid-type light polarizing film which is high in performance, and is large in area, but can be fabricated at a low cost, usable for light at a wavelength in a range of a visible light region to an infrared region.

Further, a second object of the invention is to provide a method of continuously fabricating the grid-type light polarizing film by utilizing roll-drawing techniques.

Still further, a third object of the invention is to provide a grid type reflective optical film as a composite of the grid-type light polarizing films, for use in a wide bandwidth ranging from a visible light region and an infrared region to millimeter waves and microwaves.

The first object of the invention is attainable with the following configuration. More specifically, in accordance with a first aspect of the present invention, there is provided a light polarizing film of a structure comprising anisotropic electroconductive portions, and polymer dielectric portions, obtained by a process comprising the processes of:

forming a composite film obtained by forming an electroconductive film on the entire surface on one side or both sides of a film (1) or (2), having a higher-order structure; and causing the composite film to undergo drawing before thermal setting, wherein a length of the structure comprising the anisotropic electroconductive portions, and the polymer dielectric portions, in a shorter direction, is shorter than a wavelength of an incident light to be polarized while a length of the same, in a longer direction, is longer than the wavelength of the incident light to be polarized;

the film (1) being a film having the higher-order structure wherein crystallized parts obtained by causing crystalline polymer to undergo drawing and heat treatment at a temperature not higher than a melting point and not lower than a glass transition point, and amorphous parts are alternately linked with each other, and the film (2) being a film having the higher-order structure, selected from the group of films (a) to (c), wherein phases A and B are alternately linked with each other in a drawing direction; the film (a) being a film obtained by causing an A·B type, or A·B·A type block copolymer composed of two kinds of polymers A, and B, differing in glass transition point from each other, to undergo drawing in a temperature zone between respective glass transition points of the polymers A, and B, the film (b) being a film obtained by causing a polymer blend composed of two kinds of partially compatible polymers A, and B, differing in glass transition point from each other, to undergo drawing in a temperature zone between respective glass transition points of the polymers A, and B, and the film (c) being a film obtained by causing an A·B type, or A·B·A type block copolymer, composed of a crystalline or liquid crystal polymer A, and an amorphous polymer B, to undergo drawing in a temperature zone between respective melting points of the polymers A, and B, and respective glass transition points thereof.

In this case, with the film (1) having the higher-order structure wherein the crystallized parts obtained by causing the crystalline polymer to undergo drawing and heat treatment at the temperature not higher than the melting point and not lower than the glass transition point, and the amorphous parts are alternately linked with each other, or the film (2) having the higher-order structure wherein the phases A and B are alternately linked with each other in the drawing direction, because either the crystallized parts and the amorphous parts that are fine in form or the phases A and B that are fine in form are uniformly dispersed, in the case where the composite films obtained by forming an electroconductive thin film on the entire surfaces of both the films, respectively, either the crystallized parts and the amorphous parts or the phases A and B are further subjected to drawing processing, the electroconductive thin films formed on the respective surfaces undergo regular cracking since either the crystallized parts and the amorphous parts or the phases A and B differ in drawing property from each other, thereby forming a structure comprising anisotropic electroconductive portions, and polymer dielectric portions. If the structure, comprising the anisotropic electroconductive portions, and the polymer dielectric portions, is formed such that the length thereof, in the shorter direction, is shorter than the wavelength of the incident light to be polarized while the length of the same, in the longer direction, is longer than the wavelength of the incident light to be polarized, there is provided an excellent light polarizing film. Further, thermal setting after the drawing processing is applied in order to enhance stability in whole size by preventing the film as drawn from reverting to its original state.

Further, the first object of the invention also is attainable with another configuration described hereinafter. More specifically, the invention provides in its first aspect another light polarizing film of a structure comprising anisotropic electroconductive portions, and polymer dielectric portions, obtained by a chemical precipitation method whereby an electroconductive substance is selectively formed on either of crystallized parts and amorphous parts, or either of phases A and B, on one side or both sides of a film (1) or (2), having the higher-order structure, wherein a length of the structure comprising the anisotropic electroconductive portions, and the polymer dielectric portions, in a shorter direction, is shorter than the wavelength of an incident light to be polarized while a length of the same, in a longer direction, is longer than the wavelength of the incident light to be polarized;

the film (1) being a film having the higher-order structure wherein crystallized parts obtained by causing crystalline polymer to undergo drawing and heat treatment at a temperature not higher than a melting point and not lower than a glass transition point, and amorphous parts are alternately linked with each other, and the film (2) being a film having the higher-order structure, selected from the group of films (a) to (c), wherein phases A and B are alternately linked with each other in a drawing direction; the film (a) being a film obtained by causing an A·B type, or A·B·A type block copolymer composed of two kinds of polymers A, and B, differing in glass transition point from each other, to undergo drawing in a temperature zone between respective glass transition points of the polymers A, and B, the film (b) being a film obtained by causing a polymer blend composed of two kinds of partially compatible polymers A, and B, differing in glass transition point from each other, to undergo drawing in a temperature zone between respective glass transition points of the polymers A, and B, and the film (c) being a film obtained by causing an A·B type, or A·B·A type block copolymer, composed of a crystalline or liquid crystal polymer A, and an amorphous polymer B, to undergo drawing in a temperature zone between respective melting points of the polymers A, and B, and respective glass transition points thereof.

In this case, with the film (1) having the higher-order structure wherein the crystallized parts obtained by causing the crystalline polymer to undergo drawing and heat treatment at the temperature not higher than the melting point and not lower than the glass transition point, and the amorphous parts are alternately linked with each other, or the film (2) having the higher-order structure wherein the phases A and B are alternately linked with each other in the drawing direction, it is possible to obtain a film having a higher-order structure wherein either the crystallized parts and the amorphous parts that are fine in form or the phases A and B that are fine in form have been uniformly dispersed, and a length of the crystallized part and the amorphous part, in the drawing direction, is shorter than the wavelength of the incident light to be polarized while a length of a structure comprising the crystallized parts and the amorphous parts, in the direction of a film face orthogonal to the drawing direction, is longer than the wavelength of the incident light to be polarized. It is also possible to obtain a film having a higher-order structure wherein a length of the phase A and phase B, in the drawing direction, is shorter than the wavelength of the incident light to be polarized while a length of a structure comprising the phases A and B, in the direction of a film face orthogonal to the drawing direction, is longer than the wavelength of the incident light to be polarized.

It is well known that an A·B type block copolymer at 1:1 generally forms a laminated structure according to molecular weight thereof, and a length thereof, in a shorter direction, is always on the order of several nm to several tens of nm. It is normally difficult to produce a block copolymer several μm in length, however, if a liquid crystal polymer is used for the polymer A or B, it is possible to obtain a structure as long as A4 size, in a longer direction.

Accordingly, if the electroconductive substance is formed on the film having the higher-order structure by the chemical precipitation method, the electroconductive substance is selectively formed on either of crystallized parts and amorphous parts, or on either of phases A and B, so that there is obtained the light polarizing film having an excellent structure comprising the anisotropic electroconductive portions, and the polymer dielectric portions, wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized. Further, thermal setting may be applied so as not to allow the film as drawn from reverting to its original state after the formation of the electroconductive substance, thereby enhancing stability in whole size.

Still further, the first object of the invention also is attainable with still another configuration described hereinafter. More specifically, the light polarizing film according to the invention may be of a structure comprising the anisotropic electroconductive portions, and the polymer dielectric portions, wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized, fabricated by a process comprising processes (1) to (4);

the process (1) being a process of obtaining a film having a higher-order structure, by a process (I) or process (II), the process (I) being a process of obtaining the film having the higher-order structure wherein crystallized parts and amorphous parts are alternately linked with each other by subjecting crystalline polymer to roll-drawing and heat treatment at a temperature not higher than a melting point and not lower than a glass transition point, and the process (II) being a process of obtaining the film having the higher-order structure wherein the phases A and B are alternately linked with each other in the drawing direction, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting the polymer blend composed of two kinds of the partially compatible polymers A, and B, differing in glass transition point from each other, to roll-drawing in a temperature zone between respective glass transition points of the polymers A, and B, and the process (c) being a process of subjecting the A·B type, or A·B·A type block copolymer, composed of the crystalline or liquid crystal polymer A, and the amorphous polymer B, to roll-drawing in a temperature zone between the respective melting points of the polymers A, and B, and the respective glass transition points thereof;

the process (2) being a process of obtaining a composite film by forming an electroconductive film on the entire surface on one side or both sides of the film having the higher-order structure, obtained by the process (1);

the process (3) being a process of subjecting the composite film obtained by the process (2) to further roll-drawing; and the process (4) being a process of causing a transparent polymer film having a high bonding strength or a transparent film with an adhesive or a crosslinkable tacking adhesive applied thereto to come into contact with electroconductive regions of the film obtained by the process (3) to thereby transfer the electroconductive regions to the transparent film before peeling the transparent film.

In this case, as with the light polarizing film in accordance with the first aspect of the present invention, the structure comprising the anisotropic electroconductive portions, and the polymer dielectric portions is formed in the processes (1) through (3), thereby obtaining the film wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized, and in the process (4), the electroconductive regions formed on the film is transferred to the transparent film, whereupon a structure comprising the anisotropic electroconductive portions, and the polymer dielectric portions is newly formed on the transparent film, thereby forming the light polarizing film wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized.

Yet further, the first object of the invention also is attainable with a further configuration described hereinafter. More specifically, the light polarizing film according to the invention may be of a structure comprising the anisotropic electroconductive portions, and the polymer dielectric portions, wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized, fabricated by a process comprising processes (1) to (3);

the process (1) being a process of obtaining a film having a higher-order structure, by a process (I) or process (II), the process (I) being a process of obtaining the film having the higher-order structure wherein crystallized parts and amorphous parts are alternately linked with each other by subjecting crystalline polymer to drawing and heat treatment at a temperature not higher than a melting point and not lower than a glass transition point, and the process (II) being a process of obtaining the film having the higher-order structure wherein the phases A and B are alternately linked with each other in the drawing direction, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting the polymer blend composed of two kinds of the partially compatible polymers A, and B, differing in glass transition point from each other, to drawing in a temperature zone between respective glass transition points of the polymers A, and B, and the process (c) being a process of subjecting the A·B type, or A·B·A type block copolymer, composed of the crystalline or liquid crystal polymer A, and the amorphous polymer B, to roll-drawing in a temperature zone between the respective melting points of the polymers A, and B, and the respective glass transition points thereof;

the process (2) being a process of obtaining a composite film by selectively forming an electroconductive substance, by use of the chemical precipitation method, on either of the crystallized parts and amorphous parts, or either of the phases A and B, on the entire surface on one side or both sides of the film having the higher-order structure, obtained by the process (1); and the process (3) being a process of causing a transparent polymer film having a high bonding strength or a transparent film with an adhesive or a crosslinkable tacking adhesive applied thereto to come into contact with electroconductive regions of the film obtained by the process (2) to thereby transfer the electroconductive regions to the transparent film before peeling the transparent film.

In this case, as with the light polarizing film in accordance with the first aspect of the present invention, the structure comprising the anisotropic electroconductive portions, and the polymer dielectric portions is formed in the processes (1) through (2), thereby obtaining the film wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized, and in the process (3), the electroconductive regions formed on the film is transferred to the transparent film, whereupon a structure comprising the anisotropic electroconductive portions, and the polymer dielectric portions is newly formed on the transparent film, thereby forming the light polarizing film wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized.

With the light polarizing films described in the foregoing, the length of the structure comprising the anisotropic electroconductive portions, and the polymer dielectric portions, in the shorter direction, preferably falls in a range of $1/20$ to $1/2$ of the wavelength of the incident light to be polarized while the length of the same, in the longer direction, is preferably not less than twice as long as the wavelength of the incident light to be polarized. In this case, if the length of the structure comprising the anisotropic electroconductive portions, and the polymer dielectric portions, in the shorter direction, is less than $1/20$ of the wavelength of the incident light to be polarized, this will not be preferable because absorption or reflection of light, by the anisotropic electroconductive portions, will increase, resulting in deterioration of light transmittance while if the length of the structure comprising the anisotropic electroconductive portions, and the polymer dielectric portions, in the shorter direction, exceeds $1/2$ of the wavelength, polarization property will deteriorate. Furthermore, if the length of the structure comprising the anisotropic electroconductive portions, and the polymer dielectric portions, in the longer direction, is less than twice as long as the wavelength, polarization property will deteriorate, and there is not limitation in theory to the length of the same, in the longer direction, as long as fabrication can be implemented, so that the length may be decided upon by the size of a light polarizing film.

In the case of an incident light to be polarized being a visible light, a visible light wavelength being in a range of about 400 to 700 nm, the length of the structure comprising the anisotropic electroconductive portions, and the polymer dielectric portions, in the shorter direction, may be in a range of 20 to 350 nm, and the length of the same, in the longer direction, may be not less than 800 nm, in which case the light polarizing film excellent in polarization property can be fabricated.

Further, in the case of an incident light to be polarized being infrared rays, an infrared wavelength being not less than about 700 nm, the length of the structure comprising the anisotropic electroconductive portions, and the polymer dielectric portions, in the shorter direction, may be in a range of 35 nm to 1 μm, and the length of the same, in the longer direction, may be not less than 10 μm, in which case the light polarizing film excellent in polarization property can be fabricated.

With some among the light polarizing films described in the foregoing, for the formation of the electroconductive thin film, use may be made of the vapor deposition method, the electroless plating method, the chemical vapor-phase deposition method, the physical vapor-phase deposition method, and so forth. Further, with others among the light polarizing films described in the foregoing, for the chemical precipitation method as means for forming the electroconductive thin film, use is preferably made of the electroless plating method, the vapor phase growth method, the liquid phase growth method, and so forth.

For the anisotropic electroconductive portions, use is preferably made of any selected from the group consisting of a metal such as silver, gold, nickel, chromium, copper, and so forth, or an alloy thereof, an electro-conductive polymer, such as polypyrrole, polythiophene, and so forth, and an oxide conductor such as triiron tetraoxide, and so forth.

A plurality of the light polarizing films may be combined to form the composite film by means of an adhesive or by thermal means.

Further, the light polarizing film may further comprise an antireflection film made up of dielectric multilayer film, having a double function of preventing exfoliation of the anisotropic electroconductive portions, provided on the surface of the light polarizing film, with the anisotropic electroconductive portions formed thereon.

Further, the second object of the invention also is attainable by the following method. More specifically, in accordance with a second aspect of the present invention, there is provided a method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of an incident light to be polarized while a length of the same, in a longer direction, is longer than the wavelength of the incident light to be polarized, the method comprising processes (1) to (3);

the process (1) being a process of obtaining a film having a higher-order structure, by a process (I) or process (II), the process (I) being a process of obtaining the film having the higher-order structure wherein crystallized parts and amorphous parts are alternately linked with each other by subjecting crystalline polymer to roll-drawing and heat treatment at a temperature not higher than a melting point and not lower than a glass transition point, and the process (II) being a process of obtaining the film having the higher-order structure wherein the phases A and B are alternately linked with each other in a drawing direction, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting a polymer blend composed of two kinds of partially compatible polymers A, and B, differing in glass transition point from each other, to roll-drawing in a temperature zone between respective glass transition points of the polymers A, and B, and the process (c) being a process of subjecting the A·B type, or A·B·A type block copolymer, composed of a crystalline or liquid crystal polymer A, and an amorphous polymer B, to roll-drawing in a temperature zone between the respective melting points of the polymers A, and B, and the respective glass transition points thereof;

the process (2) being a process of obtaining a composite film by forming an electroconductive film on the entire surface on one side or both sides of the film having the higher-order structure, obtained by the process (1); and the process (3) being a process of subjecting the composite film obtained by the process (2) to further roll-drawing before applying thermal setting.

Further, the second object of the invention also is attainable by another method described hereinafter. More specifically, the invention provides in its second aspect another method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of a incident light to be polarized while a length of the same, in a longer direction, is longer than the wavelength of the incident light to be polarized, the method comprising processes (1) to (2);

the process (1) being a process of obtaining a film having a higher-order structure, by a process (I) or process (II), the process (I) being a process of obtaining the film having the higher-order structure wherein crystallized parts obtained by subjecting crystalline polymer to roll-drawing and heat treatment at a temperature not higher than a melting point and not lower than a glass transition point, and amorphous parts are alternately linked with each other, and a length of the crystallized part and the amorphous part, in a drawing direction, is shorter than the wavelength of the incident light to be polarized while a length of a structure comprising the crystallized parts and the amorphous parts, in the direction of a film face orthogonal to the drawing direction, is longer than the wavelength of the incident light to be polarized, and the process (II) being a process of obtaining the film having the higher-order structure wherein the phases A and B are alternately linked with each other in the drawing direction, and a length of the phase A and phase B, in the drawing direction, is shorter than the wavelength of the incident light to be polarized while a length of a structure comprising the phases A and B, in the direction of a film face orthogonal to the drawing direction, is longer than the wavelength of the incident light to be polarized, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting a polymer blend composed of two kinds of partially compatible polymers A, and B, differing in glass transition point from each other, to roll-drawing in a temperature zone between respective glass transition points of the polymers A, and B, and the process (c) being a process of subjecting the A·B type, or A·B·A type block copolymer, composed of the crystalline or liquid crystal polymer A, and the amorphous polymer B, to roll-drawing in a temperature zone between the respective melting points of the polymers A, and B, and the respective glass transition points thereof;

the process (2) being a process of obtaining a composite film by selectively forming an electroconductive substance, by use of the chemical precipitation method, on either of the crystallized parts and amorphous parts, or either of the phases A and B, on the entire surface on one side or both sides of the film having the higher-order structure, obtained by the process (1).

Further, the second object of the invention also is attainable by still another method described hereinafter. More specifically, the invention provides in its second aspect still another method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of a incident light to be polarized while a length of the same, in a longer direction, is longer than the wavelength of the incident light to be polarized, the method comprising processes (1) to (4);

the process (1) being a process of obtaining a film having a higher-order structure, by a process (I) or process (II), the process (I) being a process of obtaining the film having the higher-order structure wherein crystallized parts and amorphous parts are alternately linked with each other by subjecting crystalline polymer to roll-drawing and heat treatment at a temperature not higher than a melting point and not lower than a glass transition point, and the process (II) being a process of obtaining the film having the higher-order structure wherein the phases A and B are alternately linked with each other in a drawing direction, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting a polymer blend composed of two kinds of partially compatible polymers A, and B, differing in glass transition point from each other, to roll-drawing in a temperature zone between respective glass transition points of the polymers A, and B, and the process (c) being a process of subjecting the A·B type, or A·B·A type block copolymer, composed of the crystalline or liquid crystal polymer A, and the amorphous polymer B, to roll-drawing in a temperature zone between the respective melting points of the polymers A, and B, and the respective glass transition points thereof;

the process (2) being a process of obtaining a composite film by forming an electroconductive film on the entire surface on one side or both sides of the film having the higher-order structure, obtained by the process (1);

the process (3) being a process of subjecting the composite film obtained by the process (2) to further roll-drawing; and the process (4) being a process of causing a transparent polymer film having a high bonding strength or a transparent film with an adhesive or a crosslinkable lacking adhesive applied thereto to come into contact with electroconductive regions of the film obtained by the process (3) to thereby transfer the electroconductive regions to the transparent film before peeling the transparent film.

Still further, the second object of the invention also is attainable by a further method described hereinafter. More specifically, the invention provides in its second aspect a further method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of a incident light to be polarized while a length of the same, in a longer direction, is longer than the wavelength of the incident light to be polarized, the method comprising processes (1) to (3);

the process (1) being a process of obtaining a film having a higher-order structure by a process (I) or process (II), the process (I) being a process of obtaining the film having the higher-order structure wherein crystallized parts obtained by subjecting crystalline polymer to roll-drawing and heat treatment at a temperature not higher than a melting point and not lower than a glass transition point, and amorphous parts are alternately linked with each other, and a length of the crystallized part and the amorphous part, in a drawing direction, is shorter than the wavelength of the incident light to be polarized while a length of a structure comprising the crystallized parts and the amorphous parts, in the direction of a film face orthogonal to the drawing direction, is longer than the wavelength of the incident light to be polarized, and the process (II) being a process of obtaining the film having the higher-order structure wherein the phases A and B are alternately linked with each other in the drawing direction, and a length of the phase A and phase B, in the drawing direction, is shorter than the wavelength of the incident light to be polarized while a length of a structure comprising the phases A and B, in the direction of a film face orthogonal to the drawing direction, is longer than the wavelength of the incident light to be polarized, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting a polymer blend composed of two kinds of partially compatible polymers A, and B, differing in glass transition point from each other, to roll-drawing in a temperature zone between respective glass transition points of the polymers A, and B, and the process (c) being a process of subjecting the A·B type, or A·B·A type block copolymer, composed of the crystalline or liquid crystal polymer A, and the amorphous polymer B, to roll-drawing in a temperature zone between the respective melting points of the polymers A, and B, and the respective glass transition points thereof;

the process (2) being a process of obtaining a composite film by selectively forming an electroconductive substance, by use of the chemical precipitation method, on either of the crystallized parts and amorphous parts, or either of the phases A and B, on the entire surface on one side or both sides of the film having the higher-order structure, obtained by the process (1), and the process (3) being a process of causing a transparent polymer film having a high bonding strength or a transparent film with an adhesive or a crosslinkable tacking adhesive applied thereto to come into contact with electroconductive regions of the film obtained by the process (2) to thereby transfer the electroconductive regions to the transparent film before peeling the transparent film.

Yet further, the second object of the invention also is attainable by a still further method described hereinafter. More specifically, the invention provides in its second aspect a still further method of continuously fabricating a light polarizing film of a structure comprising anisotropic electroconductive portions, and polymer dielectric portions, wherein a length of the structure comprising the anisotropic electroconductive portions, and the polymer dielectric portions, in a shorter direction, is shorter than the wavelength of a incident light to be polarized while a length of the same, in a longer direction, is longer than the wavelength of the incident light to be polarized, the method comprising processes (1) to (4);

the process (1) being a process of obtaining a film having a higher-order structure, by a process (I) or process (II), the process (I) being a process of obtaining the film having the higher-order structure wherein crystallized parts obtained by subjecting crystalline polymer to roll-drawing and heat treatment at a temperature not higher than a melting point and not lower than a glass transition point, and amorphous parts are alternately linked with each other, and a length of the crystallized part and the amorphous part, in a drawing direction, is shorter than the wavelength of the incident light to be polarized while a length of a structure comprising the crystallized parts and the amorphous parts, in the direction of a film face orthogonal to the drawing direction, is longer than the wavelength of the incident light to be polarized. and the process (II) being a process of obtaining the film having the higher-order structure wherein the phases A and B are alternately linked with each other in the drawing direction, and a length of the phase A and phase B, in the drawing direction, is shorter than the wavelength of the incident light to be polarized while a length of a structure comprising the phases A and B, in the direction of a film face orthogonal to the drawing direction, is longer than the wavelength of the incident light to be polarized, by any process selected from among processes (a) to (c), the process (a) being a process of subjecting the A·B type, or A·B·A type block copolymer composed of two kinds of the polymers A, and B, differing in glass transition point from each other, to roll-drawing in a temperature zone between respective glass transition points of the polymers A, and B, the process (b) being a process of subjecting a polymer blend composed of two kinds of partially compatible polymers A, and B, differing in glass transition point from each other, to roll-drawing in a temperature zone between respective glass transition points of the polymers A, and B, and the process (c) being a process of subjecting the A·B type, or A·B·A type block copolymer, composed of the crystalline or liquid crystal polymer A, and the amorphous polymer B, to roll-drawing in a temperature zone between the respective melting points of the polymers A, and B, and the respective glass transition points thereof;

the process (2) being a process of endlessly circulating the film having the higher-order structure of a predetermined length, obtained by the process (1);

the process (3) being a process of obtaining a composite film by selectively forming an electroconductive substance, by use of the chemical precipitation method, on either of the phases A and B, on one face or both faces of the film having the higher-order structure, in circulation in the process (2); and the process (4) being a process of causing a transparent polymer film having a high bonding strength or a transparent film with an adhesive or a crosslinkable tacking adhesive applied thereto to come into contact with electroconductive regions of the composed film obtained by the process (3) to thereby transfer the electroconductive regions to the transparent film before peeling the transparent film.

In the case of the above-described method of continuously fabricating the light polarizing film, the film having the higher-order structure of the predetermined length, obtained by the process (1), is in endlessly circulation in the process (2) and when the electroconductive substance is formed on the surface of the film by the chemical precipitation method, the composite film with either of the phases A and B, covered by the electroconductive substance, is obtained, and the electroconductive substance on the composite film is transferred as it is to the surface of the transparent film in the process (4). Accordingly, as for the electroconductive substance formed on the composite film, the structure comprised of the anisotropic electroconductive portions, and the polymer dielectric portions has been formed such that the length thereof, in the shorter direction, is shorter than the wavelength of light in use while the length of the same, in the longer direction, is longer than the wavelength of the light in use, so that the electroconductive substance of the light polarizing film obtained also has a structure wherein a length of the structure comprised of the anisotropic electroconductive portions, and the polymer dielectric portions, in a shorter direction, is shorter than the wavelength of the light in use while a length of the same, in a longer direction, is longer than the wavelength of the light in use.

With the method of continuously fabricating the light polarizing film according to the invention, described in the foregoing, the length of the structure comprising the anisotropic electroconductive portions, and the polymer dielectric portions, in the shorter direction, preferably falls in a range of 1/20 to 1/2 of the wavelength of the incident light to be polarized while the length of the same, in the longer direction, is preferably not less than twice as long as the wavelength of the incident light to be polarized. In this case, if the length of the structure comprising the anisotropic electroconductive portions, and the polymer dielectric portions, in the shorter direction, is less than 1/20 of the wavelength of the incident light to be polarized, this will not be preferable because absorption or reflection of light, by the anisotropic electroconductive portions, will increase, resulting in deterioration of light transmittance while if the length of the structure comprising the anisotropic electroconductive portions, and the polymer dielectric portions, in the shorter direction, exceeds 1/2 of the wavelength, polarization efficiency will deteriorate. Furthermore, if the length of the structure comprising the anisotropic electroconductive portions, and the polymer dielectric portions, in the longer direction, is less than twice as long as the wavelength, polarization efficiency will deteriorate, and there is not limitation in theory to the length of the same, in the longer direction, as long as fabrication can be implemented, so that the length may be decided upon by the size of a light polarizing film.

In the case of an incident light to be polarized being a visible light, a visible light wavelength being in a range of about 400 to 700 nm, the length of the structure comprising the anisotropic electroconductive portions, and the polymer dielectric portions, in the shorter direction, may be in a range of 20 to 350 nm, and the length of the same, in the longer direction, may be not less than 800 nm, in which case the light polarizing film excellent in polarization efficiency can be fabricated.

Further, in the case of an incident light to be polarized being infrared rays, an infrared wavelength being not less than about 700 nm, the length of the structure comprising the anisotropic electroconductive portions, and the polymer dielectric portions, in the shorter direction, may be in a range of 35 nm to 1 μm, and the length of the same, in the longer direction, may be not less than 10 μm, in which case the light polarizing film excellent in polarization efficiency can be fabricated.

With some among the methods of continuously fabricating the light polarizing film described in the foregoing, for the formation of the electroconductive thin film, use may be made of the vapor deposition method, the electroless plating method, the chemical vapor-phase deposition method, the physical vapor-phase deposition method, and so forth. Further, with others among the methods of continuously fabricating the light polarizing film in the foregoing, for the chemical precipitation method as means for forming the electroconductive thin film, use is preferably made of the electroless plating method, the vapor phase growth method, the liquid phase growth method, and so forth.

With the methods of continuously fabricating the light polarizing film in the foregoing, for the anisotropic electroconductive portions, use is preferably made of any selected from the group consisting of a metal such as silver, gold, nickel, chromium, copper, and so forth, or an alloy thereof, an electro-conductive polymer, such as polypyrrole, polythiophene, and so forth, and an oxide conductor such as triiron tetraoxide, and so forth.

A plurality of the light polarizing films may be combined to form the composite film by means of an adhesive or by thermal means. Further, the method of continuously fabricating the light polarizing film in the foregoing may further comprise a process of forming an antireflection film made up of dielectric multilayer film, having a double function of preventing exfoliation of the anisotropic electroconductive portions, on the surface of the light polarizing film, with the anisotropic electroconductive portions formed thereon.

Still further, the third object of the invention is attainable by the following configuration. More specifically, in accordance with a third aspect of the present invention, there is provided a reflective light polarizing film of a structure wherein two sheets of films each made up of the light polarizing film described in the foregoing are disposed such that respective electroconductive substances thereof cross each other at right angles.

In this case, the above-described light polarizing film of the grid type has a function of reflecting a light component having an oscillation plane in the longitudinal direction of electroconductive portions, and transmitting a light component having an oscillation plane in a direction orthogonal to the longitudinal direction of the electroconductive portions. Accordingly, if two sheets of the light polarizing films of the grid-type are superimposed one on the other so as to cross each other at right angles, there is obtained the reflective optical film acting in effect like a mirror by reflecting all components of incident light, falling on all the oscillation planes thereof.

In this case, by selecting the dimensions of the structure comprising the anisotropic electroconductive portions, and the polymer dielectric portions, it is possible to reflect visible light, infrared rays, millimeter waves, and microwaves, or to transmit the visible light while reflecting the infrared rays, millimeter waves, and microwaves.

Thus, the present invention has advantageous effects described hereunder. More specifically, as described in detail hereinafter with reference to the embodiments of the invention, the invention in its first aspect provides a film-like light polarizing film of the grid-type, large in area, excellent in polarization property, high in light transmittance, and usable in a range of a visible light region to an infrared region. With some of the light polarizing films according to the invention, in particular, since the plurality of the light polarizing films may be combined to form the composite film, the polarization property thereof is enhanced.

Further, with another of the light polarizing films according to the invention, since the antireflection film made up of the dielectric multilayer film, having the double function of preventing the exfoliation of the anisotropic electroconductive portions, may be provided on the surface of the light polarizing film, with the anisotropic electroconductive portions formed thereon, there can be obtained a light polarizing film capable of checking deterioration thereof, and enhancing light transmittance thereof.

Further, the invention in its second aspect provides the method of continuously fabricating the light polarizing film, capable of fabricating any of the light polarizing films according to the invention, large in area, at a low cost with ease.

Still further, the invention in its third aspect provides the reflective optical film large in area, and in a film-like form, capable of reflecting light or an electromagnetic wave at a predetermined wavelength. Accordingly, with the use of the reflective optical film in the front glass, side glass, and the like of an automobile, it is possible to protect a driver of the automobile from glare even if subjected to a high beam of an opposing car, or with the use of the reflective optical film in glass windows, and the like of a building, it is possible to reflect infrared rays, or electromagnetic waves longer in wavelength than infrared rays while permitting visible light to pass through the glass windows, and the like, so that not only the interior of the building becomes brighter but also heat insulation property of the building is enhanced.

PREFERRED EMBODIMENTS OF THE INVENTION

The best mode for carrying out the invention is described hereinafter with reference to preferred embodiments of the invention. It is to be pointed out, however, that the invention is not limited thereto, and that various changes and modifications may be made in the invention without departing from the spirit and scope of the following claims.

Embodiment 1

Figure 1:
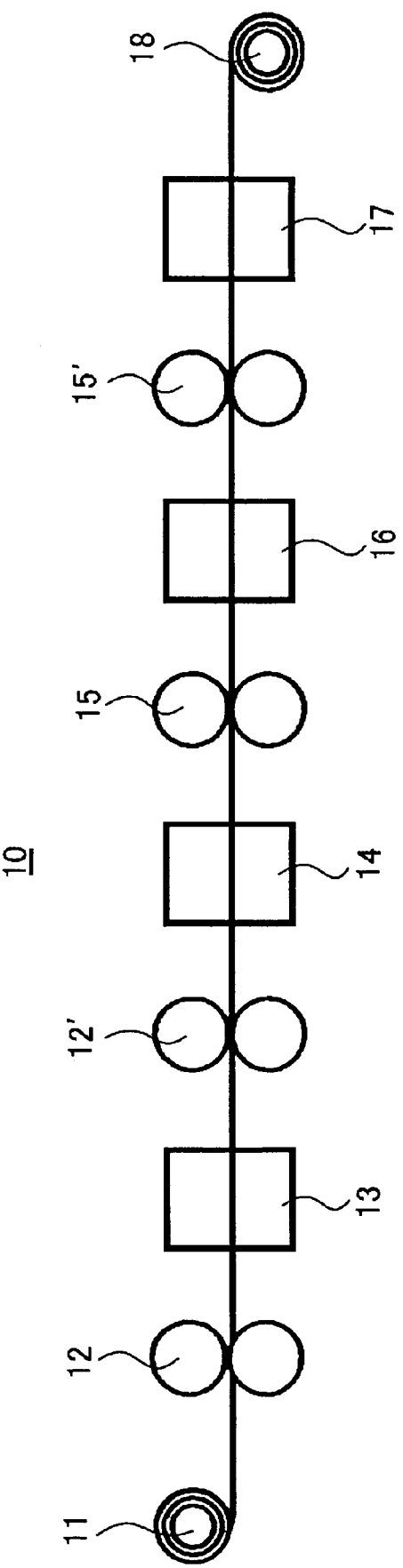
FIG. 1 is a schematic representation broadly showing a continuous fabrication system for a film-like light polarizing film for use in carrying out a first embodiment of the invention.

In the case of an embodiment 1, a film-like light polarizing film was fabricated by causing an aluminum metal to be precipitated on the surface of a polypropylene film by means of vapor deposition with the use of a continuous fabrication system 10 for a light polarizing film, as shown in FIG. 1. First, the polypropylene film fed from a polypropylene film feed rolls 11 was passed through rolls 12, a first constant temperature cell 13, and rolls 12' to thereby undergo uniaxial drawing by 4-fold. The rolls 12, and rolls 12' are uniaxial drawing means for executing drawing by utilizing difference in peripheral velocity therebetween. The first constant temperature cell 13 was installed in order to provide a drawing condition. In this case, it was kept at 100° C. Thereafter, the aluminum metal was vapor-deposited to a thickness of 100 nm in a vacuum deposition cell 14 to be subsequently passed through rolls 15, a second constant temperature cell 16 kept at 120° C., and rolls 15', and was caused to undergo uniaxial drawing by 2-fold again while partially crystallizing the polypropylene film.

At this point in time, crystallized parts and amorphous parts of the polypropylene film were uniformly dispersed throughout the polypropylene film, and the crystallized parts differed in drawing property from the amorphous parts, so that the aluminum metal underwent substantially uniform cracking in a direction orthogonal to a drawing direction. Thereafter, heat treatment was applied to the film in a third constant temperature cell 17 kept at 130° C. for 5 minutes to provide stability in size, and the film was taken out by take-up rolls 18. The film-like light polarizing device obtained as above had a degree of polarization at 99.5%, and light transmittance at 90%, in a region of infrared wavelength in a range of 1 to 10 µm. With two sheets of the films crossed at right angles, reflectance thereof for infrared rays was measured and was found at not less than 99.9%.

Embodiment 2

Figure 2:
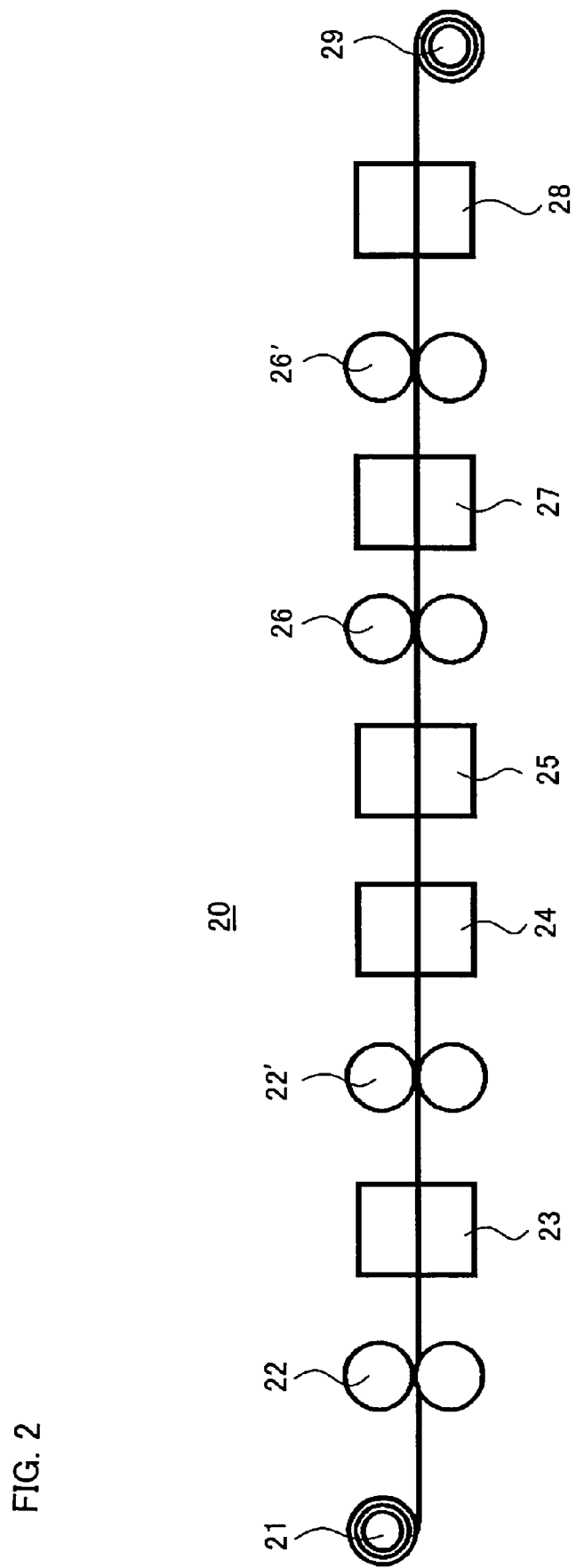
FIG. 2 is a schematic representation broadly showing a continuous fabrication system for a film-like light polarizing film for use in carrying out a second embodiment of the invention.

In the case of an embodiment 2, a film-like light polarizing device was fabricated by causing an aluminum metal to be precipitated on the surface of a poly(vinylidene fluoride) film by means of vapor deposition with the use of a continuous fabrication system 20 for a light polarizing film, as shown in FIG. 2. First, the poly(vinylidene fluoride) film fed from a poly(vinylidene fluoride) film feed rolls 21 was passed through rolls 22, a first constant temperature cell 23 kept at 60° C., and rolls 22' to thereby undergo uniaxial drawing by 5-fold, and subsequently, heat treatment was applied to the film in a second constant temperature cell 24 kept at 120° C. for 5 minutes while keep the film in tension, thereby causing portions of the poly(vinylidene fluoride) film to be crystallized.

Thereafter, the aluminum metal was vapor-deposited to a thickness of about 50 nm in a vacuum deposition cell 25 to be subsequently passed through rolls 26, a third constant temperature cell 27 kept at 80° C., and rolls 26' to thereby undergo uniaxial drawing again by 2-fold, and thereafter, heat treatment was applied to the film in a fourth constant temperature cell 28 kept at 130° C. for 5 minutes to provide stability in size, whereupon the film was taken out by take-up rolls 29. Upon measurement of polarization performance of the film-like light polarizing device obtained as above, the polarization performance was found to have a light quenching ratio of 1:300 at a visible light wavelength in a range of 420 to 700 nm.

Embodiment 3

In the case of an embodiment 3, a film-like light polarizing device was fabricated by causing a silver metal to be precipitated on the surface of a polypropylene film by the chemical plating (electroless plating) method. First, the polypropylene film was caused to undergo 5-fold drawing, and subsequently, heat treatment was applied to the film at 110° C. for 10 minutes while keep the film in tension, thereby causing portions of the polypropylene film to be crystallized. After passing the film in tin (II) chloride solution, the film was lightly rinsed in water, and was passed in ammoniacal silver nitrate solution to cause the electroless plating to be applied to only the amorphous parts of the film, with tin (II) chloride selectively adsorbed thereto, thereby causing the silver metal to be unevenly precipitated on the surface of the film. The polarization performance of the film-like light polarizing device obtained as above was found to have a light quenching ratio of 1:5000 at a visible light wavelength in the range of 420 to 700 nm. Further, the light transmittance of the same was found at 48%.

The embodiment 3 shows an example of using silver for an electroless-plating layer, however, use can be made of a metal such as gold, nickel, chromium, copper, and so forth, besides silver. Further, use can be made of an electro-conductive polymer, such as polypyrrole, polythiophene, and so forth, and an oxide conductor such as triiron tetraoxide, and so forth. For example, in the case of forming the electro-conductive polymer such as polypyrrole, polythiophene, and so forth, fine wires composed of the electro-conductive polymer, such as polypyrrole, polythiophene, and so forth, are formed only in regions where there exists the oxidizing reagent that has been initially adsorbed by use of a solution of an oxidizing reagent, such as iron (III) chloride solution, aqueous hydrogen peroxide, and so forth, and respective monomer solutions or monomer vapors.

Embodiment 4

In the case of an embodiment 4, an A·B type block copolymer composed of block copolymers of ethylene oxide (A) and a carbonate (B) was drawn to thereby prepare a film controlling a higher-order structure such that an ethylene oxide layer was oriented at an angle of 90±5° to a drawing direction. At the time of executing extrusion-molding of the A·B type block copolymer, the higher-order was controlled by applying tension thereto such that A·B lamellar layers were oriented within ±10° to a direction normal to the longitudinal direction of the film. After carrying out vacuum deposition of an electro-conductive substance, for example, an aluminum metal, on the film, the film was subjected to 2.5-fold drawing. In this case, a phase A and a phase B were uniformly dispersed throughout the film, and furthermore, the phase A differed in drawing property from the phase B, so that the aluminum metal underwent substantially uniform cracking in a direction orthogonal to the drawing direction. The degree of polarization of a film-like light polarizing device obtained as above was found at 99.8% at a visible light wavelength in the range of 420 to 700 nm.

Embodiment 5

In the case of an embodiment 5, as with the case of the embodiment 4, an A·B type block copolymer composed of ethylene oxide and the carbonate was drawn to thereby prepare a film controlling a higher-order structure such that an ethylene oxide layer was oriented at an angle of 90±5° to a drawing direction, and the film was immersed in tin (II) chloride solution, whereupon tin (II) chloride was adsorbed to the ethylene oxide layer, which was a hydrophilic part. Thereafter, the electroless metal plating was applied to the film. The polarization performance of a film-like light polarizing device obtained as above was found at 99% in the visible light region. It was possible to fabricate the film-like light polarizing device obtained as above from a block copolymer composed of styrene hydroethylmethacrylate (HEMA) as well.

Embodiment 6

Figure 3:
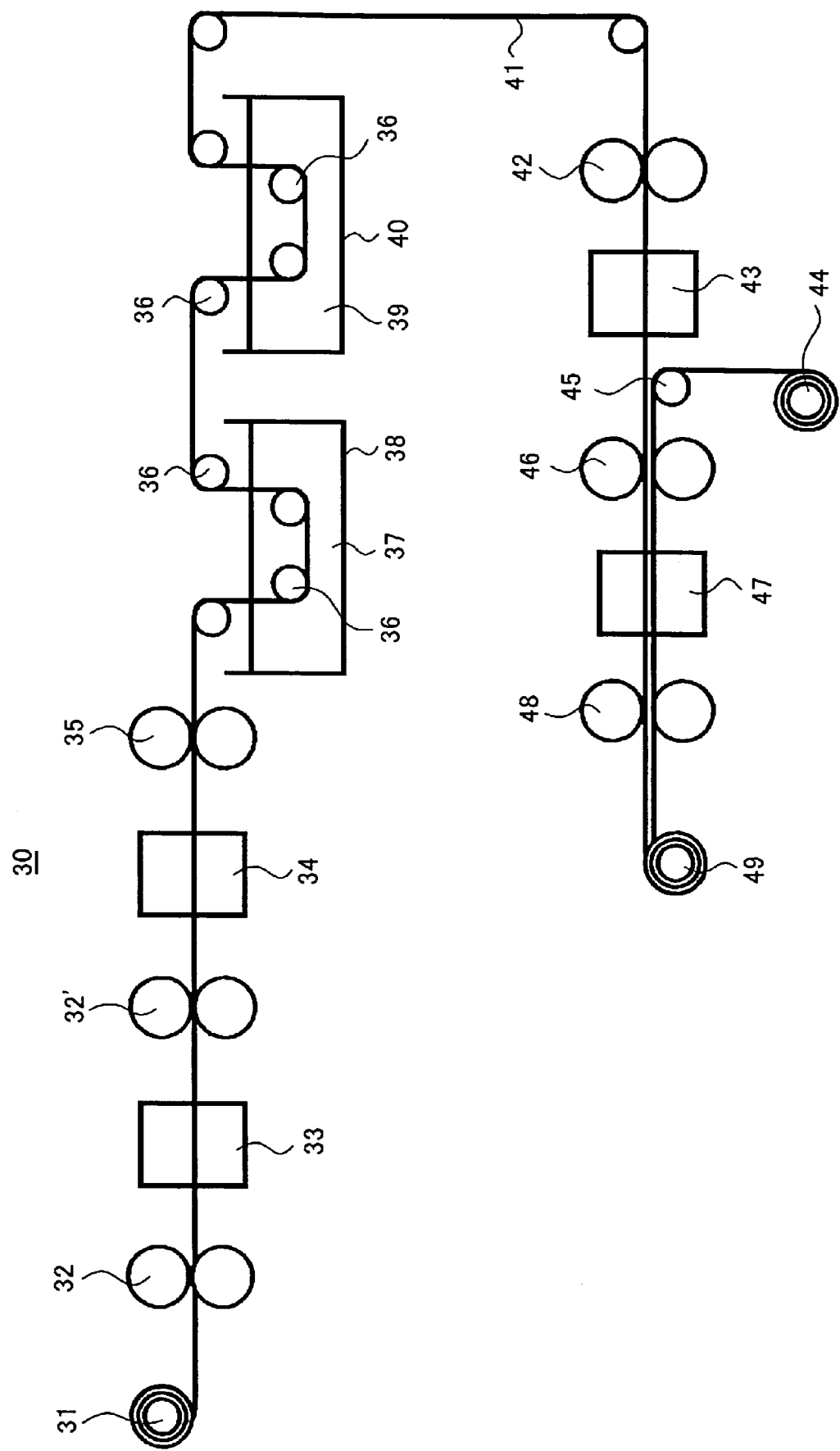
FIG. 3 is a schematic representation broadly showing a continuous fabrication system for a film-like light polarizing film for use in carrying out a first embodiment of the invention.

In the case of an embodiment 6, a film-like light polarizing device with an antireflection film provided on the surface of an electro-conductive substance thereof was fabricated after causing a silver metal to be precipitated on the surface of a polypropylene film by the electroless plating method with the use of a continuous fabrication system 30 for a light polarizing film, as shown in FIG. 3. First, the polypropylene film fed from a polypropylene film feed rolls 31 was passed through rolls 32, a first constant temperature cell 33 kept at 80° C., and rolls 32' in sequence to thereby undergo uniaxial drawing by 5-fold. Thereafter, the polypropylene film that was drawn was immersed in a second constant temperature cell 34 kept at a temperature higher than that for the first constant temperature cell 33, that is, at 110° C. in this case for 10 minutes while keep the film in tension, thereby applying heat treatment thereto. Amorphous parts of the polypropylene film were eased off by such heat treatment, and were prevented from undergoing contraction even if a force was removed, so that stability in size was thereby provided.

The film was first passed into a first cell 38 containing tin (II) chloride solution 37 via rolls 35 having the same peripheral velocity as that for the rolls 32', and a film guide 36. When the film was passed through the first cell 38, tin (II) chloride was adsorbed to the amorphous parts. Thereafter, the film was lightly rinsed in water, and was subsequently passed into a second cell 40 containing ammoniacal silver nitrate solution 39. When the film was passed through the second cell 40, the electroless plating was applied only to the amorphous parts with tin (II) chloride selectively adsorbed, whereupon silver ions in the ammoniacal silver nitrate solution 39 were turned into silver metal to be unevenly precipitated on the surface of the film.

The polypropylene film 41 delivered from the second cell 40, only the amorphous parts of which were coated with the electro-conductive substance composed of silver, was first passed into a third cell 43 kept at 130° C. for 5 minutes via rolls 42, thereby increasing bond strength of the electro-conductive substance while providing stability in size. Subsequently, the antireflection film fabricated by alternately laminating polymers of low refractive index, in plurality layers, to polymers of high refractive index, in plurality layers, fed from antireflection film feed rolls 44, was deposited on the surface of the film fed from the third cell 43, provided with the electro-conductive substance, via rolls 45, to be subsequently bonded through the intermediary of rolls 46. The antireflection film as newly added has a function of not only preventing reflection but also preventing exfoliation of the electro-conductive substance bonded on the surface of the light polarizing film by the agency of a strong pressing force applied by the rolls 46. Thereafter, the film was provided with bond stability in a heat treatment equipment 47, and was taken out by take-up rolls 49 via rolls 48. It was confirmed that the film-like light polarizing device as taken up by the rolls 49 had a polarization effect equivalent to that for the film-like light polarizing device according to the embodiment 3.

Embodiment 7

Figure 4:
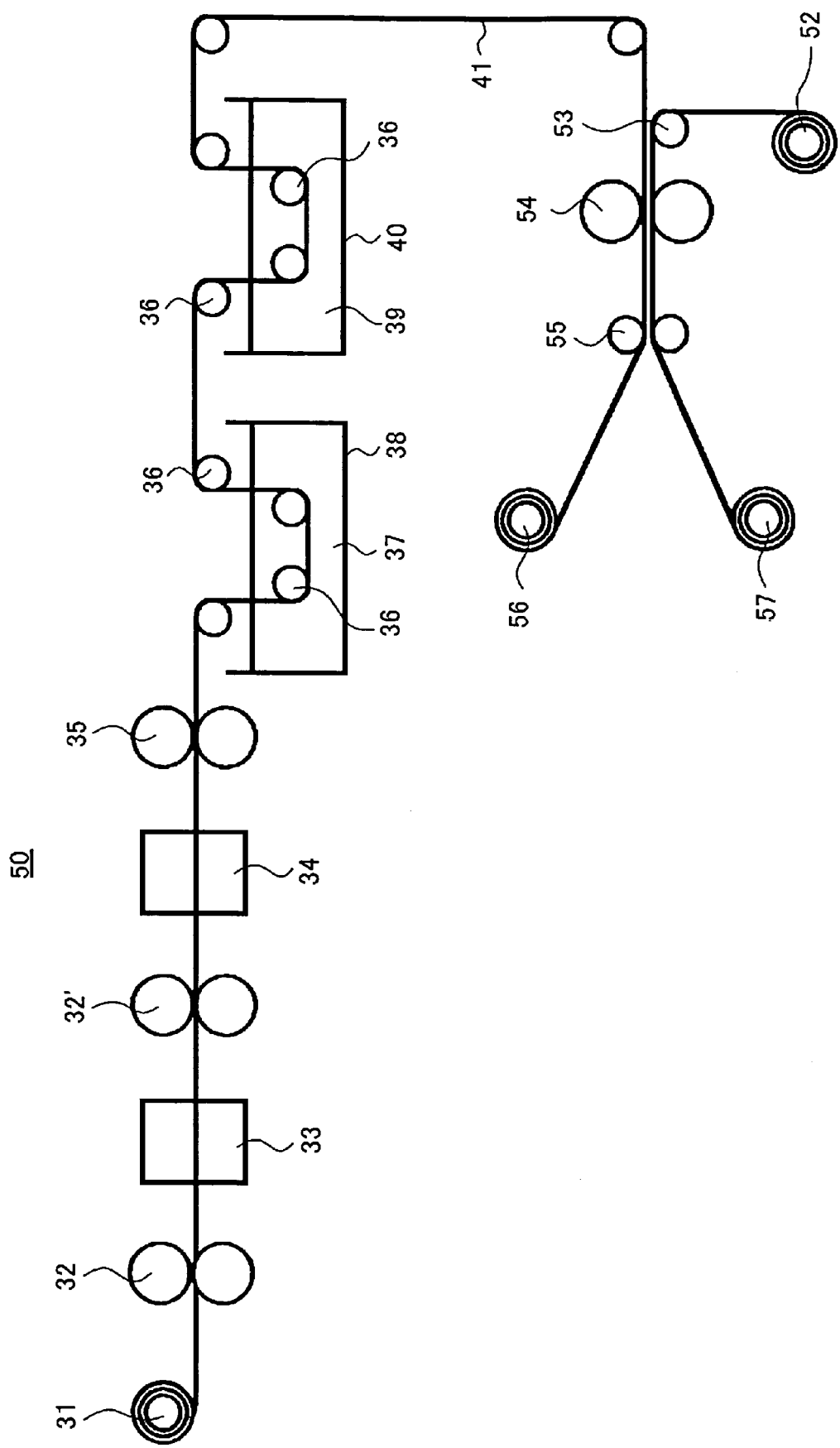
FIG. 4 is a schematic representation broadly showing a continuous fabrication system for a film-like light polarizing film for use in carrying out a seventh embodiment of the invention.

In the case of an embodiment 7, after causing a silver metal to be precipitated on the surface of a polypropylene film by the chemical plating (electroless plating) method with the use of a continuous fabrication system 50 for a light polarizing film, as shown in FIG. 4, the silver metal formed on the surface of the film was transferred to the surface of a transparent film, thereby fabricating a film-like light polarizing device. In FIG. 4, since a process up to a process of obtaining a polypropylene film 41 with the silver metal precipitated on the surface thereof by use of the electroless plating method is in common with that for the embodiment 6 shown in FIG. 3, common constituent parts in the figure are denoted by like reference numerals in FIG. 3, omitting therefore detailed description thereof.

A transparent polyethylene terephthalate (PET) film provided with an acrylic adhesive having a high bonding strength against an electro-conductive substance composed of silver, fed from a PET film feed roll 52, was deposited via a roll 53 on the surface of the polypropylene film 41 delivered from a second cell 40, only amorphous parts of which were coated with the electro-conductive substance composed of silver, with the electro-conductive substance attached thereto, and a strong pressing force was applied thereto through the intermediary of transfer rolls 54. Subsequently, both the films were peeled off each other through rolls 55, thereby causing the polypropylene film to be taken up by a roll 56, and the transparent PET film to be taken up by a roll 57. All the electro-conductive substance composed of silver, formed on the surface of the polypropylene film 41, was found transferred onto the transparent PET film taken up by the roll 57. It was confirmed that the film-like light polarizing device as taken up by the roll 57 had a polarization effect equivalent to that for the film-like light polarizing device according to the embodiment 3. Further, with the embodiment 7, for a film to which the electro-conductive substance is transferred, use was made of the PET film with the acrylic adhesive applied thereto, however, alternatively, use may be made of other transparent polymer films such as polyester, polypropylene, poly (methyl methacrylate), polycarbonate, and so forth.

Embodiment 8

Figure 5:
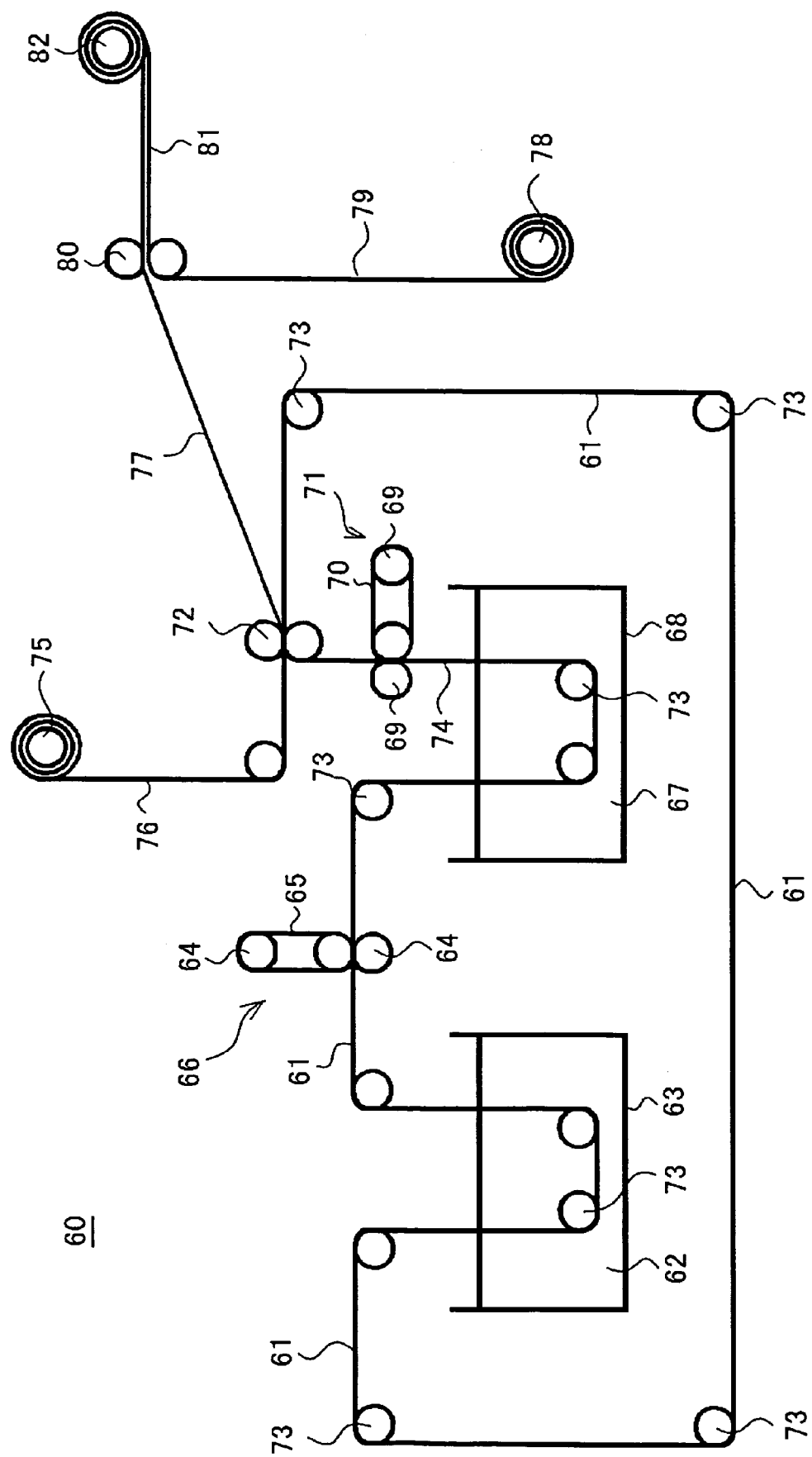
FIG. 5 is a schematic representation broadly showing a continuous fabrication system for a film-like light polarizing film for use in carrying out an eighth first embodiment of the invention.

In the case of an embodiment 8, after continuously forming an electro-conductive substance by the electroless plating method on the surface of a film controlling a higher-order structure comprised of an A·B type block copolymer composed of ethylene oxide (A) and a carbonate (B), the electro-conductive substance was transferred from the surface of the film to the surface of a transparent film, and further, an antireflection film was provided the surface of the electro-conductive substance with the use of a continuous fabrication system 60 for a light polarizing film, as shown in FIG. 5.

First, an A·B type block copolymer composed of ethylene oxide and a carbonate was drawn by the same method as described in the embodiment 4 to thereby prepare a film 61 controlling a higher-order structure such that an ethylene oxide layer was oriented at an angle of 90±5° to a drawing direction. A first cell 63 containing tin (II) chloride solution 62, a first moisture remover 66 comprising guide rollers 64 and a moisture removal film 65, a second cell 68 containing ammoniacal silver nitrate solution 67, a second moisture remover 71 comprising guide rollers 69 and a moisture removal film 70, transfer rollers 72, and a plurality of guide rollers 73 were disposed such that the film 61 was circulated endlessly and continuously through those constituent members in that order.

When the film 61 was passed through the first cell 63, as tin (II) chloride was adsorbed to only the surface of an ethylene oxide layer, which was a hydrophilic part, the film 61 was lightly rinsed in water by the first moisture remover 66 before removal of moisture, and was subsequently passed through the second cell 68, whereupon silver ions were turned into silver metal selectively in portions with tin (II) chloride adsorbed thereto and the silver metal was unevenly precipitated on the surface of the film. A film 74 with the silver metal precipitated thereon was lightly rinsed in water by the second moisture remover 71 before removal of moisture, and a transparent film 76 with an adhesive applied to the surface thereof, fed from a film feed roll 75, was fed such that the surface of the transparent film 76, with the adhesive applied, was butted against the surface of the film 74, with the silver metal precipitated thereon. Then, both the films 74, 76 were passed through the transfer rollers 72 to be thereby press-bonded.

Thereafter, upon separation of both the films 74, 76, passed through the transfer rollers 72, from each other, there was obtained a film 77 to which the silver metal bonded to the surface of the film 74 was transferred. At this point in time, an antireflection film 79 separately fed from an antireflection film feed roll 78 was fed in such a way as to cover the silver metal on the film 77, thereby press-bonding both the films 77, and 79 through drive rolls 80, whereupon there was obtained a film 81 comprising a light polarizing film integral with the antireflection film, and the film 81 was then taken out by a take-up roll 82. The polarization property of a film-like light polarizing device obtained as above was found at 99% at a visible light wavelength in the range of 420 to 700 nm.

Further, with the embodiment 8, for the film 61 having the higher-order structure, endlessly and continuously circulating, use was made of the A·B type block copolymer composed of ethylene oxide and the carbonate, subjected to drawing processing, however, use is not limited thereto, and, for example, a block copolymer having hydrophobic parts and hydrophilic parts, such as styrene-ethylene-oxide block copolymer, styrene-HEMA copolymer, and so forth, can be used. As those block copolymers are expensive, endless circulation thereof can contribute to reduction in quantity for use.

Further, for the transparent film 76, use can be made of polypropylene, polycarbonate, poly (methyl methacrylate), polyethylene terephthalate, polysulfone, polybutyryl, and so forth. Still further, for the adhesive provided on the transparent film 76, use can be made of any adhesive suitably selected from the group of adhesives of acrylic base, cyanoacrylate base, urea base, and so forth.

What is claimed is:

1. A light polarizing film of a structure comprising anisotropic electroconductive portions, and polymer dielectric portions, obtained by a process comprising the processes of:
   forming a composite film obtained by forming an electroconductive film on the entire surface on one side or both sides of a film (1) or (2), having a higher-order structure; and
   causing the composite film to undergo drawing before thermal setting, wherein a length of the structure comprising the anisotropic electroconductive portions, and the polymer dielectric portions, in a shorter direction, is shorter than a wavelength of an incident light to be polarized while a length of the same, in a longer direction, is longer than the wavelength of the incident light to be polarized;
   said film (1) being a film having the higher-order structure wherein crystallized parts obtained by causing crystalline polymer to undergo drawing and heat treatment at a temperature not higher than a melting point and not lower than a glass transition point, and amorphous parts are alternately linked with each other; and
   said film (2) being a film having the higher-order structure, selected from the group of films (a) to (c), wherein phases A and B are alternately linked with each other in a drawing direction;
      said film (a) being a film obtained by causing an A×B type, or A×B×A type block copolymer composed of two kinds of polymers A, and B, differing in glass transition point from each other, to undergo drawing in a temperature zone between respective glass transition points of the polymers A, and B;
      said film (b) being a film obtained by causing a polymer blend composed of two kinds of partially compatible polymers A, and B, differing in glass transition point from each other, to undergo drawing in a temperature zone between respective glass transition points of the polymers A, and B; and
      said film (c) being a film obtained by causing an A×B type, or A×B×A type block copolymer, composed of a crystalline or liquid crystal polymer A, and an amorphous polymer B, to undergo drawing in a temperature zone between respective melting points of the polymers A, and B, and respective glass transition points thereof.

2. A light polarizing film of a structure comprising anisotropic electroconductive portions, and polymer dielectric portions, obtained by a chemical precipitation method whereby an electroconductive substance is selectively formed on either of crystallized parts and amorphous parts, or either of phases A and B, on one side or both sides of a film (1) or (2), having the higher-order structure, wherein a length of the structure comprising the anisotropic electroconductive portions, and the polymer dielectric portions, in a shorter direction, is shorter than the wavelength of an incident light to be polarized while a length of the same, in a longer direction, is longer than the wavelength of the incident light to be polarized;
   said film (1) being a film having the higher-order structure wherein crystallized parts obtained by causing crystalline polymer to undergo drawing and heat treatment at a temperature not higher than a melting point and not lower than a glass transition point, and amorphous parts are alternately linked with each other; and said film (2) being a film having the higher-order structure, selected from the group of films (a) to (c), wherein phases A and B are alternately linked with each other in a drawing direction;

said film (a) being a film obtained by causing an A×B type, or A×B×A type block copolymer composed of two kinds of polymers A, and B, differing in glass transition point from each other, to undergo drawing in a temperature zone between respective glass transition points of the polymers A, and B;

said film (b) being a film obtained by causing a polymer blend composed of two kinds of partially compatible polymers A, and B, differing in glass transition point from each other, to undergo drawing in a temperature zone between respective glass transition points of the polymers A, and B; and said film (c) being a film obtained by causing an A×B type, or A×B×A type block copolymer, composed of a crystalline or liquid crystal polymer A, and an amorphous polymer B, to undergo drawing in a temperature zone between respective melting points of the polymers A, and B, and respective glass transition points thereof.

3. A light polarizing film of a structure comprising anisotropic electroconductive portions, and polymer dielectric portions, wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized, fabricated by a process comprising processes (1) to (4);

said process (1) being a process of obtaining a film having a higher-order structure, by a process (I) or process (II);

said process (I) being a process of obtaining the film having the higher-order structure wherein crystallized parts and amorphous parts are alternately linked with each other by subjecting crystalline polymer to roll-drawing and heat treatment at a temperature not higher than a melting point and not lower than a glass transition point; and said process (II) being a process of obtaining the film having the higher-order structure wherein the phases A and B are alternately linked with each other in the drawing direction, by any process selected from among processes (a) to (c);

said process (a) being a process of subjecting the A×B type, or A×B×A type block copolymer composed of two kinds of the polymers A, and B, differing in glass transition point from each other, to roll-drawing in a temperature zone between respective glass transition points of the polymers A, and B;

said process (b) being a process of subjecting the polymer blend composed of two kinds of the partially compatible polymers A, and B, differing in glass transition point from each other, to roll-drawing in a temperature zone between respective glass transition points of the polymers A, and B; and said process (c) being a process of subjecting the A×B type, or A×B×A type block copolymer, composed of the crystalline or liquid crystal polymer A, and the amorphous polymer B, to roll-drawing in a temperature zone between the respective melting points of the polymers A, and B, and the respective glass transition points thereof;

said process (2) being a process of obtaining a composite film by forming an electroconductive film on the entire surface on one side or both sides of the film having the higher-order structure, obtained by said process (1);

said process (3) being a process of subjecting the composite film obtained by said process (2) to further roll-drawing; and said process (4) being a process of causing a transparent polymer film having a high bonding strength or a transparent film with an adhesive or a crosslinkable tacking adhesive applied thereto to come into contact with electroconductive regions of the film obtained by said process (3) to thereby transfer the electroconductive regions to the transparent film before peeling the transparent film.

4. A light polarizing film of a structure comprising anisotropic electroconductive portions, and polymer dielectric portions, wherein the length of the structure comprising the anisotropic electroconductive portions, and the polymer dielectric portions, in the shorter direction, is shorter than the wavelength of the incident light to be polarized while the length of the same, in the longer direction, is longer than the wavelength of the incident light to be polarized, fabricated by a process comprising processes (1) to (3);

said process (1) being a process of obtaining a film having a higher-order structure, by a process (I) or process (II);

said process (I) being a process of obtaining the film having the higher-order structure wherein crystallized parts and amorphous parts are alternately linked with each other by subjecting crystalline polymer to drawing and heat treatment at a temperature not higher than a melting point and not lower than a glass transition point; and said process (II) being a process of obtaining the film having the higher-order structure wherein the phases A and B are alternately linked with each other in the drawing direction, by any process selected from among processes (a) to (c);

said process (a) being a process of subjecting the A×B type, or A×B×A type block copolymer composed of two kinds of the polymers A, and B, differing in glass transition point from each other, to roll-drawing in a temperature zone between respective glass transition points of the polymers A, and B;

said process (b) being a process of subjecting the polymer blend composed of two kinds of the partially compatible polymers A, and B, differing in glass transition point from each other, to drawing in a temperature zone between respective glass transition points of the polymers A, and B; and said process (c) being a process of subjecting the A×B type, or A×B×A type block copolymer, composed of the crystalline or liquid crystal polymer A, and the amorphous polymer B, to roll-drawing in a temperature zone between the respective melting points of the polymers A, and B, and the respective glass transition points thereof;

said process (2) being a process of obtaining a composite film by selectively forming an electroconductive substance, by use of the chemical precipitation method, on either of the crystallized parts and amorphous parts, or either of the phases A and B, on the entire surface on one side or both sides of the film having the higher-order structure, obtained by said process (1); and said process (3) being a process of causing a transparent polymer film having a high bonding strength or a transparent film with an adhesive or a crosslinkable tacking adhesive applied thereto to come into contact with electroconductive regions of the film obtained by said process (2) to thereby transfer the electroconductive regions to the transparent film before peeling the transparent film.

5. A light polarizing film according to any one of claims 1 to 4, wherein the length of the structure comprising the anisotropic electroconductive portions, and the polymer dielectric portions, in the shorter direction, falls in a range of $1/20$ to $1/2$ of the wavelength of the incident light to be polarized while the length of the same, in the longer direction, is not less than twice as long as the wavelength of the incident light to be polarized.

6. A light polarizing film according to claim 5, wherein an incident light to be polarized is a visible light, and the length of the structure comprising the anisotropic electroconductive portions, and the polymer dielectric portions, in the shorter direction, is in a range of 20 to 350 nm, and the length of the same, in the longer direction, is not less than 800 nm.

7. A light polarizing film according to claim 5, wherein an incident light to be polarized is infrared rays, and the length of the structure comprising the anisotropic electroconductive portions, and the polymer dielectric portions, in the shorter direction, is in a range of 35 nm to 1 μm, and the length of the same, in the longer direction, is not less than 10 μm.

8. A light polarizing film according to claim 1 or 3, wherein the electroconductive thin film is formed by at least one of selected from the vapor deposition method, the electroless plating method, the chemical vapor-phase deposition method, and the physical vapor-phase deposition method.

9. A light polarizing film according to claim 2 or 4, wherein the chemical precipitation method is any one of selected from the electroless plating method, the vapor phase growth method, and the liquid phase growth method.

10. A light polarizing film according to any one of claims 1 to 4, wherein the anisotropic electroconductive portions are made of any one of selected from the group consisting of a metal such as silver, gold, nickel, chromium, copper, and so forth, or an alloy thereof, an electro-conductive polymer, such as polypyrrole, polythiophene, and so forth, and an oxide conductor such as triiron tetraoxide, and so forth.

11. A light polarizing film according to claim 1 or 3, wherein a plurality of the light polarizing films are combined to form the composite film by means of an adhesive or by thermal means.

12. A light polarizing film according to claims 1 to 4, wherein the light polarizing film further comprises an anti-reflection film made up of dielectric multilayer film, having a double function of preventing exfoliation of the anisotropic electroconductive portions, provided on the surface of the light polarizing film, with the anisotropic electroconductive portions formed thereon.

13. A light polarizing film wherein two sheets of films each made up of the light polarizing film described in anyone of claims 1 to 4 are disposed such that respective electroconductive substances thereof cross each other at right angles.

14. A light polarizing film according to claim 13, wherein visible light, infrared rays, millimeter waves, and microwaves are reflected.

15. A light polarizing film according to claim 13, wherein the visible light is transmitted while the infrared rays, millimeter waves, and microwaves are reflected.

* * * * *